United States Patent
Ryu et al.

(10) Patent No.: US 12,416,351 B1
(45) Date of Patent: Sep. 16, 2025

(54) INTEGRATED ACTUATOR ASSEMBLY FOR DISCONNECTOR DEVICE AND ELECTRONIC LIMITED SLIP DIFFERENTIAL DEVICE

(71) Applicants: HYUNDAI MOTOR COMPANY, Seoul (KR); KIA CORPORATION, Seoul (KR)

(72) Inventors: Young-Bae Ryu, Hwaseong-si (KR); Kang-Soo Seo, Hwaseong-si (KR); Jin-Seung Lim, Hwaseong-si (KR); Jae-Weon Jun, Hwaseong-si (KR); Sang-Bum Baek, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/947,692

(22) Filed: Nov. 14, 2024

(30) Foreign Application Priority Data

Jul. 11, 2024 (KR) .................. 10-2024-0091703

(51) Int. Cl.
*F16H 48/34* (2012.01)
*F16H 48/24* (2006.01)

(52) U.S. Cl.
CPC ............. *F16H 48/34* (2013.01); *F16H 48/24* (2013.01); *F16H 2048/343* (2013.01)

(58) Field of Classification Search
CPC ....... B60K 17/356; F16H 48/34; F16H 48/24; F16H 2048/343; F16H 63/32; F16H 59/041
See application file for complete search history.

(56) References Cited

U.S. PATENT DOCUMENTS

| | | | |
|---|---|---|---|
| 2010/0229668 A1* | 9/2010 | Smith | F16H 63/30 74/473.11 |
| 2013/0167681 A1* | 7/2013 | Kii | B60K 23/08 74/473.12 |
| 2014/0243138 A1* | 8/2014 | Kii | B60K 23/08 74/473.1 |
| 2019/0331206 A1* | 10/2019 | Yudell | F16H 48/34 |
| 2022/0252155 A1* | 8/2022 | Kawamoto | B60K 6/387 |
| 2022/0355655 A1* | 11/2022 | Fang | F16H 3/666 |
| 2022/0379711 A1* | 12/2022 | Gassmann | B60K 6/547 |
| 2024/0200613 A1* | 6/2024 | Hans | F16D 21/02 |

FOREIGN PATENT DOCUMENTS

KR  2023-0025175 A  2/2023

* cited by examiner

*Primary Examiner* — Lori Wu
(74) *Attorney, Agent, or Firm* — McDonnell Boehnen Hulbert & Berghoff LLP

(57) ABSTRACT

An integrated actuator assembly for a disconnector device and an electronic limited slip differential (eLSD) device includes a driving motor, a screw shaft rotated by the driving motor, a screw nut screw-coupled to the screw shaft and moving linearly in an axial direction of the screw shaft by the rotation of the screw shaft, a first fork unit engaged with the screw nut to linearly move a first sleeve of a disconnector device, a second fork unit engaged with the screw nut to linearly move a second sleeve of an eLSD device, and a fork selection member for controlling the screw nut to be selectively engaged with any one of the first fork unit and the second fork unit.

11 Claims, 8 Drawing Sheets

INTEGRATED ACTUATOR ASSEMBLY FOR DISCONNECTOR DEVICE AND ELECTRONIC LIMITED SLIP DIFFERENTIAL DEVICE

CROSS REFERENCE TO RELATED APPLICATIONS

This application claims priority to Korean Patent Application No. 10-2024-0091703, filed on Jul. 11, 2024, which is incorporated herein by reference in its entirety.

BACKGROUND

Field of the Disclosure

The present disclosure relates to an integrated actuator assembly for a disconnector device and an electronic limited slip differential device, which may sequentially operate the disconnector device and electrode limited slip differential device for a vehicle using one actuator.

Description of Related Art

Since four-wheel drive electric vehicles experience drag loss in a non-driven wheel when two wheels are driven or during coasting traveling, a disconnector device for mechanically blocking connection between the non-driven wheel and a motor and a reducer is provided.

The disconnector device allows an electric vehicle to selectively travel using four wheels and two wheels to reduce no-load drag loss.

In addition, a separate electronic limited slip differential (eLSD) device is installed to improve the traveling performance of the vehicle and compensate for the loss of a driving force due to wheel slip, etc. As the eLSD device is provided, handling performance and starting performance are improved.

Both the disconnector device and the eLSD device need to be provided in the vehicle, which acts as a factor that increases the production cost and weight of the vehicle.

In particular, when the disconnector device and the eLSD device are installed inside the vehicle, there is a problem that many spaces, such as a space in which the disconnector device and the eLSD device are installed and a space in which an actuator for operating the disconnector device and the eLSD device is installed, are required.

SUMMARY

The present disclosure has been invented to solve the above problems and is directed to providing an integrated actuator assembly for a disconnector device and an electronic limited slip differential (eLSD) device, which can minimize a space required for installation and operation by sequentially operating the disconnector device and the eLSD device using one driving motor.

An integrated actuator assembly for a disconnector device and an electronic limited slip differential (eLSD) device according to the present disclosure for achieving the above object includes a driving motor, a screw shaft rotated by the driving motor, a screw nut screw-coupled to the screw shaft and linearly moving in an axial direction of the screw shaft by the rotation of the screw shaft, a first fork unit engaged with the screw nut to linearly move a first sleeve of the disconnector device, a second fork unit engaged with the screw nut to linearly move a second sleeve of the eLSD device, and a fork selection member configured to control the screw nut to be selectively engaged with any one of the first fork unit and the second fork unit.

The fork selection member includes a guide groove formed in a surface of the screw nut along a trajectory set on the screw nut at a predetermined depth, and a guide bolt which guides linear movement of the screw nut and into which an end portion is inserted into the guide groove so that the screw nut rotates along a linear movement displacement of the screw nut.

The guide groove is formed with a disconnector device manipulation section formed in the axial direction of the screw nut, an eLSD manipulation section disposed at an interval in a circumference direction of the screw nut from the disconnector device manipulation section and formed in an axial direction of the screw nut, and a connection section connecting one end of the eLSD manipulation section from the other end of the disconnector device manipulation section.

An angle formed between the connection section and the disconnector device manipulation section or the eLSD manipulation section is an obtuse angle.

The screw nut is formed with a control finger extending in the radial circumference direction of the screw nut so that the control finger is selectively engaged with any one of the first fork unit and the second fork unit.

The screw nut rotates in the circumference direction of the screw nut so that the control finger is selectively engaged with any one of the first fork unit and the second fork unit.

The first fork unit includes a first lug engaged with the control finger, and a first fork formed integrally with the first lug and coupled by being fitted into a circumference of the first sleeve, and the second fork unit includes a second lug engaged with the control finger, and a second fork formed integrally with the second lug and coupled by being fitted into a circumference of the second sleeve.

The control finger is selectively engaged with any one of the first lug and the second lug.

The first lug and the second lug are disposed at a predetermined angle in the circumference direction of the screw nut.

A manipulation groove to which the control finger is engaged is formed in each of the first lug and the second lug.

A center of the first sleeve matches a center of the second sleeve.

According to the integrated actuator assembly for a disconnector device and an electronic limited slip differential (eLSD) device of the present disclosure having the above configuration, it is possible to minimize the space required for installation and operation by sequentially operating the disconnector device and the eLSD device using one driving motor.

In addition, by operating the disconnector device and the eLSD device using one driving motor, it is possible to reduce the number of parts, simplify the structure, and save the production cost.

DETAILED DESCRIPTION

Figure 1:
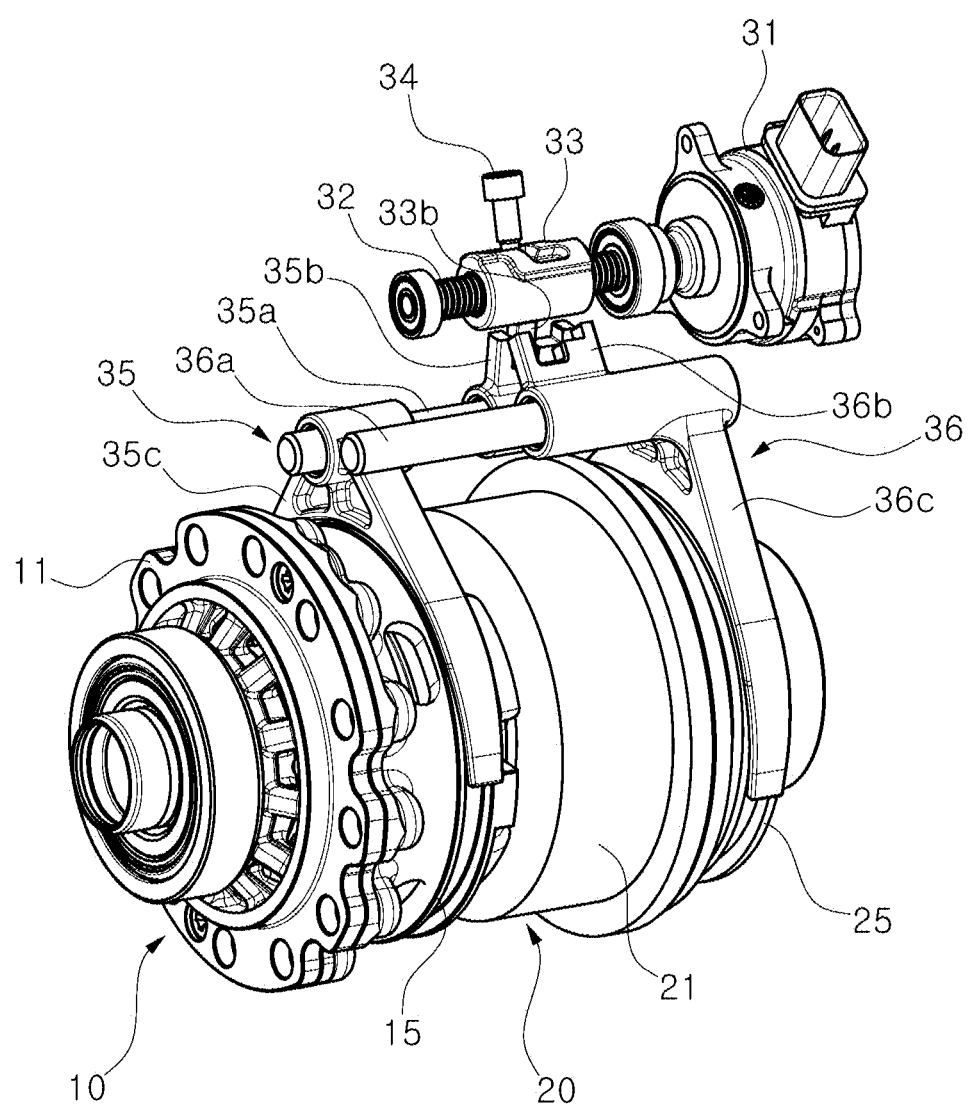
FIG. 1 is a perspective view of a disconnector device-electronic limited slip differential (eLSD) device in which an integrated actuator assembly for a disconnector device and an eLSD device according to the present disclosure is used.
Figure 2:
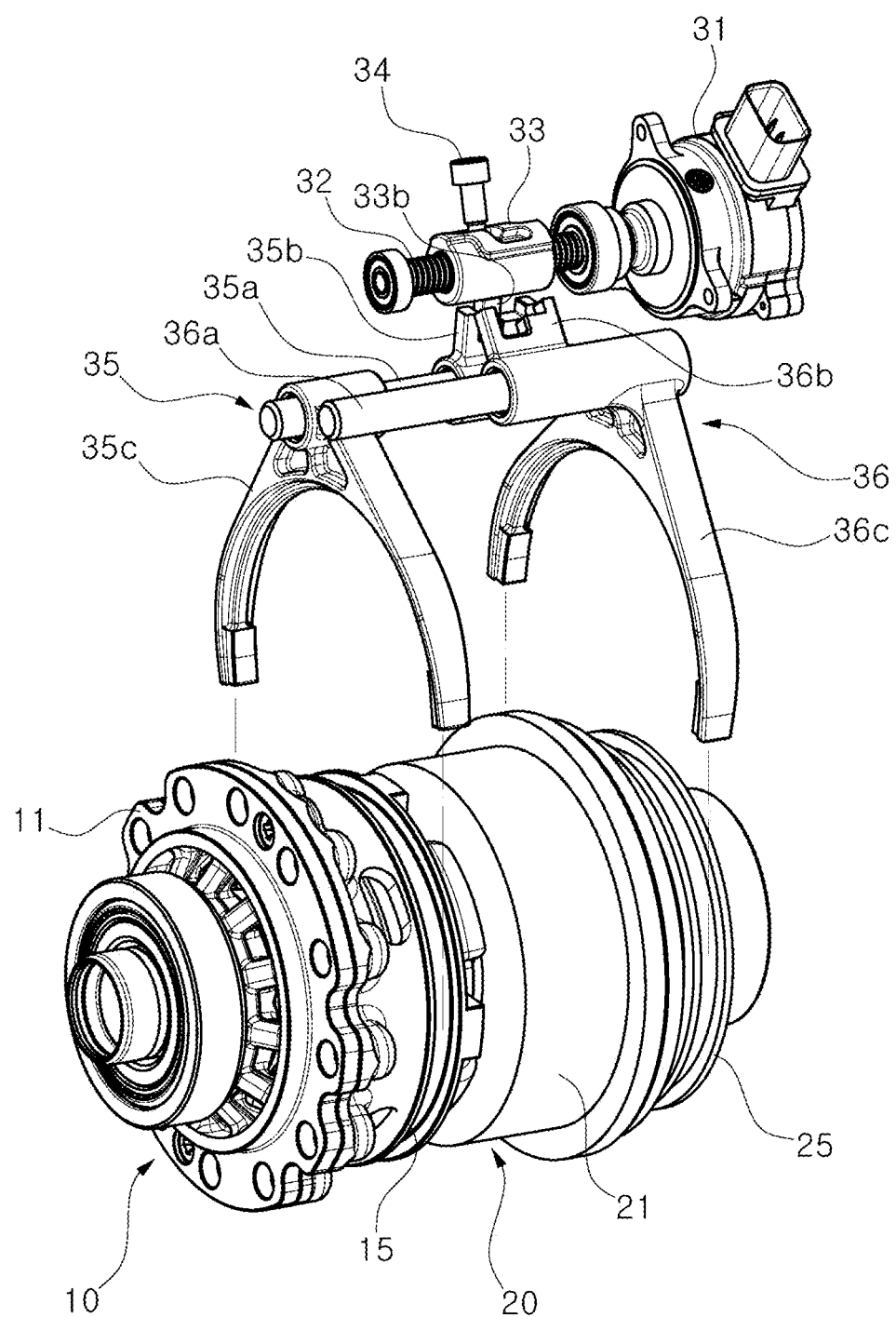
FIG. 2 is a perspective view showing a state in which the integrated actuator assembly for a disconnector device and an eLSD device according to the present disclosure has been separated from the disconnector device-eLSD device.

Hereinafter, an integrated actuator assembly for a disconnector device and an electronic limited slip differential device according to the present disclosure will be described in detail with reference to the accompanying drawings.

The integrated actuator assembly for a disconnector device and an electronic limited slip differential (eLSD) device according to the present disclosure includes a driving motor 31, a screw shaft 32 rotated by the driving motor 31, a screw nut 33 screw-coupled to the screw shaft 32 and moving linearly in an axial direction of the screw shaft 32 by the rotation of the screw shaft 32, a first fork unit 35 engaged with the screw nut 33 to linearly move a first sleeve 15 of a disconnector device 10, a second fork unit 36 engaged with the screw nut 33 to linearly move a second sleeve 25 of an eLSD device 20, and a fork selection member for controlling the screw nut 33 to be selectively engaged with any one of the first fork unit 35 and the second fork unit 36.

The disconnector device 10 and the eLSD device 20 are configured integrally by coupling a hub and multi-plate clutch of the eLSD device 20 to a side gear of the disconnector device 10 and have the actuator assembly installed at an outer side thereof.

Only one actuator assembly is installed, and the disconnector device 10 and the eLSD device 20 are manipulated by the first fork unit 35 and the second fork unit 36 that are installed in the actuator assembly, respectively. And, the disconnector device 10 and the eLSD device 20 are operated sequentially.

The driving motor 31 is fixedly installed at one side of a vehicle. The driving motor 31 rotates in one direction or an opposite direction according to a signal input from a controller (not shown) so that the disconnector device 10 and the eLSD device 20 are engaged or disengaged.

The screw shaft 32 has threads formed on an outer surface thereof and is rotated by the driving motor 31.

The screw nut 33 is screw-coupled to the screw shaft 32. Since the screw nut 33 is screw-coupled to the screw shaft 32, when the rotation of the screw nut 33 is restricted by a guide bolt 34 to be described below, the screw nut 33 moves linearly in the axial direction of the screw shaft 32.

A control finger 33b is formed to protrude in a radial direction of the screw nut 33. A selected one of the disconnector device 10 and the eLSD device 20 is manipulated by the control finger 33b.

The first fork unit 35 is engaged with the screw nut 33 to linearly move the first sleeve 15 of the disconnector device 10, and the second fork unit 36 is engaged with the screw nut 33 to linearly move the second sleeve 25 of the eLSD device 20.

The disconnector device 10 and the eLSD device 20 are disposed so that an axial center of the first sleeve 15 matches an axial center of the second sleeve 25. As the axial center of the first sleeve 15 matches the axial center of the second sleeve 25, a compression direction of the multi-plate clutch in the eLSD device 20 becomes the same as the axial direction of the disconnector device 10.

Structures of the first fork unit 35 and the second fork unit 36 are as follows.

The first fork unit 35 includes a first lug 35b engaged with the control finger 33b, a first fork 35c coupled by being fitted into a perimeter of the first sleeve 15 of the disconnector device 10, and a first rod 35a connecting the first lug 35b to the first fork 35c.

Figure 5:
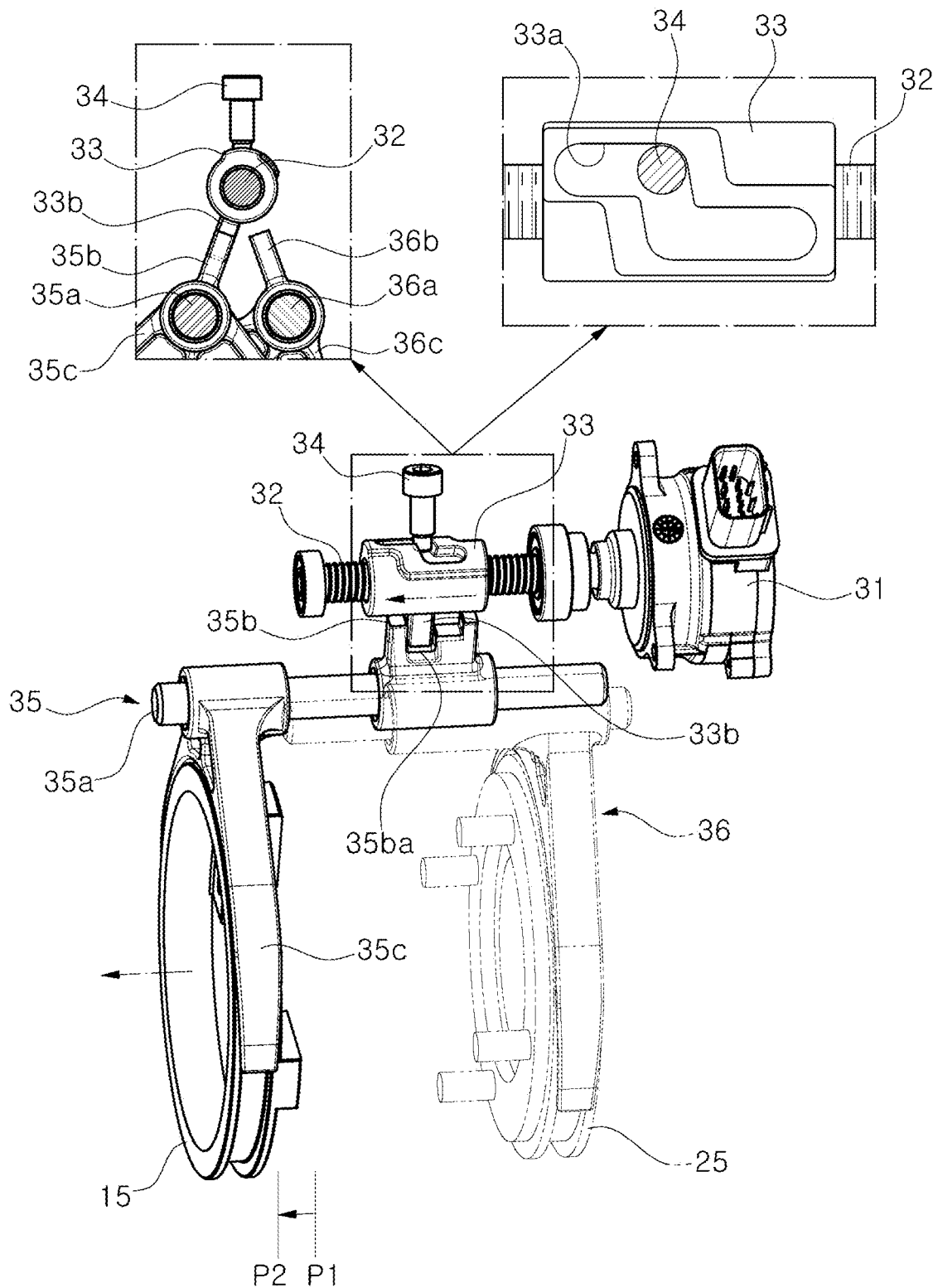
FIG. 5 is a perspective view, side view, and state view of the guide groove showing the integrated actuator assembly for a disconnector device and an eLSD device according to the present disclosure in a state in which the guide bolt is located at P2 of the guide groove.
Figure 6:
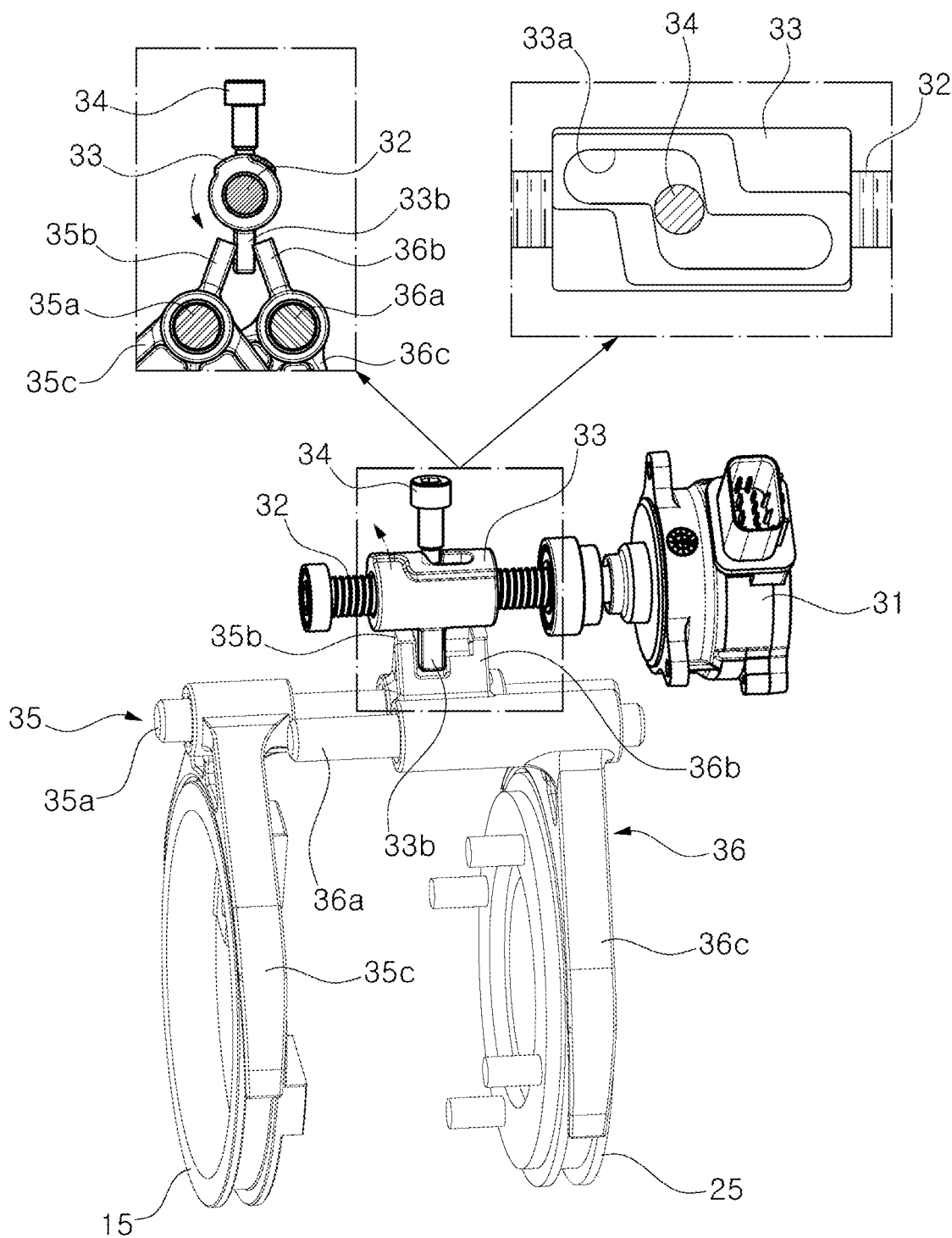
FIG. 6 is a perspective view, side view, and state view of the guide groove showing the integrated actuator assembly for a disconnector device and an eLSD device according to the present disclosure in a state in which the guide bolt is located at P3 of the guide groove.

The first lug 35b is formed with a manipulation groove 35ba that accommodates the control finger 33b so that the first lug 35b is engaged with the control finger 33b. Since the manipulation groove 35ba is open in a circumference direction of the screw nut 33. Accordingly, the control finger 33b may be located inside the manipulation groove 35ba or separated from the manipulation groove 35ba by rotation. When the control finger 33b is located inside the manipulation groove 35ba, the control finger 33b is engaged with the first lug 35b so that the screw nut 33 and the first fork unit 35 linearly move together. For example, FIG. 5 shows that the control finger 33b of the screw nut 33 is located inside the manipulation groove 35ba, and FIG. 6 shows that the control finger 33b of the screw nut 33 is separated from the manipulation groove 35ba by rotation of the screw nut 33.

Since the first fork 35c is coupled by being fitted into a circumference of the first sleeve 15, when the first fork 35c moves linearly, the first sleeve 15 moves linearly to manipulate the disconnector device 10.

In particular, the first sleeve 15 may be located outside a housing 11 in the disconnector device 10, thereby reducing a length of the disconnector device 10.

The first rod 35a is fastened to the first lug 35b and the first fork 35c so that the first lug 35b and the first fork 35c are integrated. The linear movement of the first fork unit 35 may be guided using the first rod 35a.

The second fork unit 36 also includes a second lug 36b engaged with the control finger 33b, a second fork 36c that is formed integrally with the second lug 36b and coupled by being fitted into a circumference of the second sleeve 25, and a second rod 36a integrally fastened to the second lug 36b and the second fork 36c.

The second lug 36b is also formed with a manipulation groove 36ba. When the control finger 33b is located in the manipulation groove 36ba, the control finger 33b is engaged with the second lug 36b so that the screw nut 33 and the second fork unit 36 linearly move together.

Since the second fork 36c is coupled by being fitted into the circumference of the second sleeve 25, when the second fork 36c moves linearly, the eLSD device 20 is manipulated to be engaged or disengaged.

The second rod 36a is integrally fastened to the second lug 36b and the second fork to move together. The linear movement of the second fork unit 36 may be guided using the second rod 36a.

However, the first fork unit 35 and the second fork unit 36 are not engaged with the screw nut 33 at the same time but are selectively engaged with any one of the first fork unit 35 and the second fork unit 36.

To this end, a fork selection member for allowing the screw nut 33 to be selectively engaged with any one of the first fork unit 35 and the second fork unit 36 is included.

The fork selection member includes a guide groove 33a formed in a surface of the screw nut 33 along a trajectory set on the screw nut 33 at a predetermined depth, and the guide bolt 34 whose end portion is inserted into the guide groove 33a so that the screw nut 33 rotates according to the linear movement displacement of the screw nut 33.

The guide groove 33a is formed in the surface of the screw nut 33 at a predetermined depth. The guide groove 33a is generally formed in a longitudinal direction of the screw nut 33, and in a section in which the control finger 33b moves between the first lug 35b and the second lug 36b, is formed substantially in the circumference direction of the screw nut 33.

The guide bolt 34 is installed in a state of being fixed to the vehicle. The end portion of the guide bolt 34 is inserted into the guide groove 33a.

Therefore, the guide bolt 34 guides the linear movement of the screw nut 33 and rotates the screw nut 33 according to the linear movement displacement of the screw nut 33.

The guide bolt 34 controls the screw nut 33 while moving relatively with respect to the screw nut 33. Here, when the guide bolt 34 moves relatively with respect to the screw nut 33, it means that, when the guide bolt 34 is located from P1 to P5 in FIG. 3, the guide bolt 34 does not move to the right side of the drawing, but actually, the screw nut 33 moves to the left side of the drawing in a fixed state of the guide bolt 34.

Figure 3:
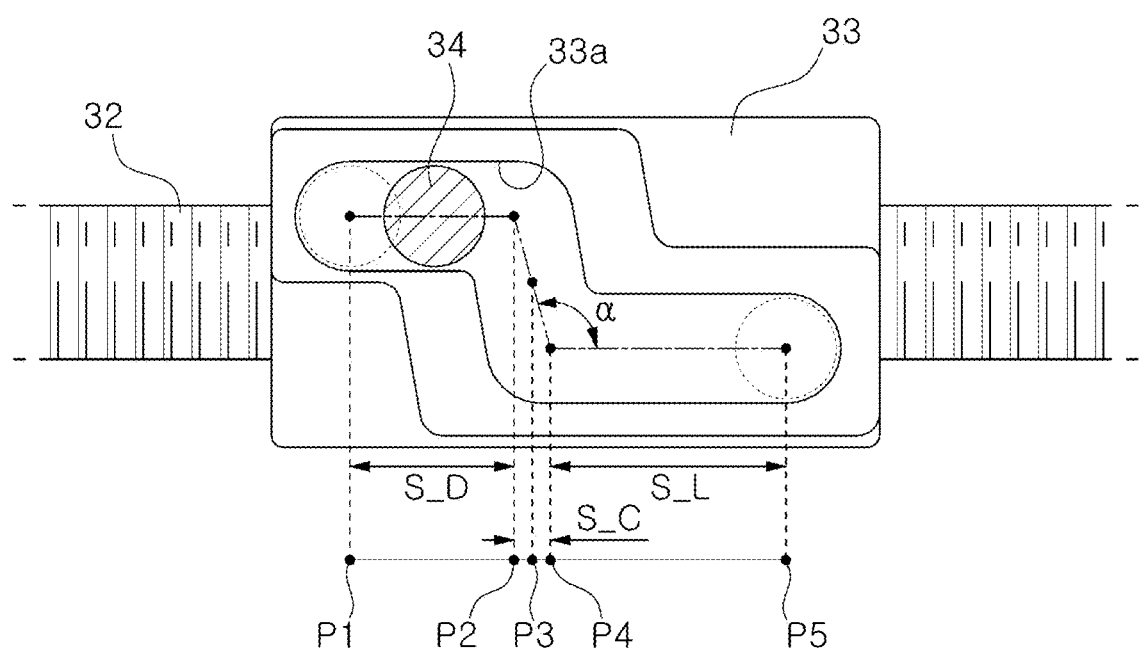
FIG. 3 is a plan view showing a guide groove of a screw nut.

In FIG. 3, a trajectory of the guide bolt 34 moving relatively with respect to the guide groove 33a is marked by single-dotted lines. In FIG. 3, although it is shown that the guide bolt 34 moves in the guide groove 33a, actually, the screw nut 33 moves with respect to the fixed guide bolt 34.

The guide groove 33a includes a disconnector device manipulation section S_D formed in the longitudinal direction of the screw nut 33, an eLSD manipulation section S_L disposed at intervals from the disconnector device manipulation section S_D in the circumference direction of the screw nut 33, and a connection section S_C that connects one end of the eLSD manipulation section S_L to the other end of the disconnector device manipulation section S_D. Referring to FIG. 3, locations of start and end points of each section are shown as P1 to P5 (however, P3 is located in the middle of the connection section), and a state in which these are projected onto a straight line is shown. The guide bolt 34 moves relatively along the set trajectory, and at this time, the screw nut 33 linearly moves as much as a displacement projected onto the straight line.

Since the disconnector device manipulation section S_D and the eLSD manipulation section S_L are formed linearly, the screw nut 33 converts a rotational movement of the screw shaft 32 into a linear movement to linearly move the first fork unit 35 or the second fork unit 36 and manipulate the disconnector device 10 or the eLSD device 20.

Meanwhile, the first lug 35b and the second lug 36b are disposed at a predetermined angle in the circumference direction of the screw nut 33 so that the control finger 33b is engaged with any one of the first lug 35b and the second lug 36b by rotation. Since the control finger 33b is engaged with any one of the first lug 35b and the second lug 36b by rotation, the first lug 35b and the second lug 36b are disposed at the predetermined angle in the circumference direction of the screw nut 33, and thus the control finger 33b is engaged with any one of the first lug 35b and the second lug 36b by rotation.

To this end, the disconnector device manipulation section S_D and the eLSD manipulation section S_L are disposed at an interval in the circumference direction of the screw nut 33 in the guide groove 33a.

The connection section S_C forms an obtuse angle with the axial direction of the screw nut 33. In FIG. 3, as an angle α between the connection section and the eLSD manipulation section S_L is shown as being an obtuse angle, the connection section S_C forms the obtuse angle with the axial direction of the screw nut 33. Since the disconnector device manipulation section S_D is parallel to the eLSD manipulation section S_L, an angle between the connection section and the disconnector device manipulation section S_D is also an obtuse angle.

Therefore, the guide bolt 34 may smoothly move when moving from the disconnector device manipulation section S_D to the eLSD manipulation section S_L or conversely moving from the eLSD manipulation section S_L to the disconnector device manipulation section S_D.

When the screw nut 33 linearly moves in a state in which the guide bolt 34 is located in the disconnector device manipulation section S_D, the screw nut 33 moves linearly together with the first fork unit 35 to manipulate the disconnector device 10. That is, when the guide bolt 34 moves from P1 to P2, the first fork unit 35 also moves from P1 to P2 so that the disconnector device 10 is fastened.

The screw nut 33 also rotates in a state in which the guide bolt 34 is located in the connection section S_C so that the control finger 33b moves between the first lug 35b and the second lug 36b. As the screw nut 33 rotates, the control finger 33b rotates to be separated from the first lug 35b and engaged with the second lug 36b or conversely, to be separated from the second lug 36b and engaged with the first lug 35b.

When the screw nut 33 linearly moves in a state in which the guide bolt 34 is located in the eLSD manipulation section S_L, the screw nut 33 moves linearly together with the second fork unit 36 to manipulate the eLSD device 20.

An operation of the integrated actuator assembly for a disconnector device and an eLSD device according to the present disclosure having the above configuration is as follows.

Figure 4:
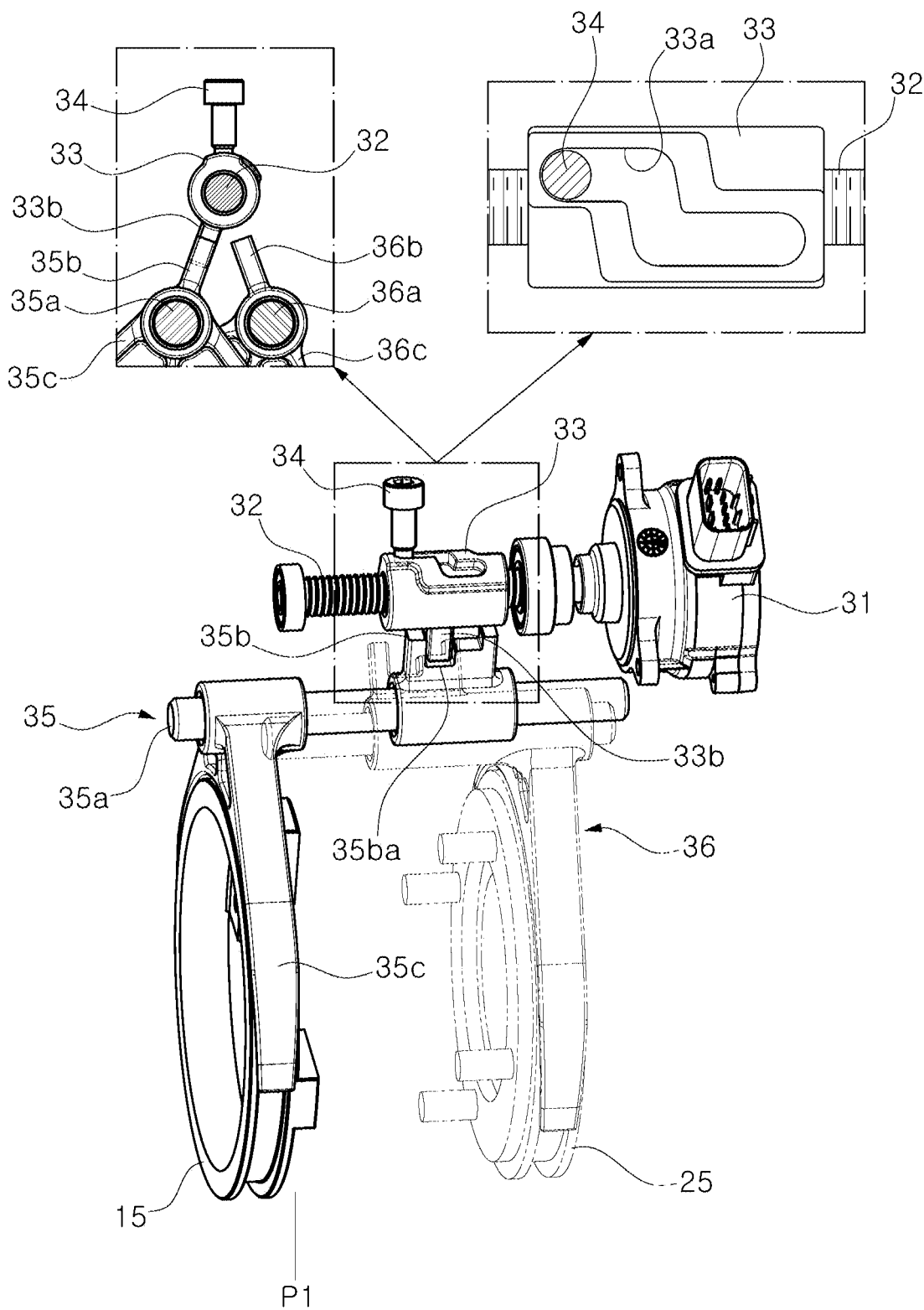
FIG. 4 is a perspective view, side view, and state view of the guide groove showing the integrated actuator assembly for a disconnector device and an eLSD device according to the present disclosure in a state in which a guide bolt is located at P1 of the guide groove.

FIG. 4 shows a state in which both the disconnector device and the eLSD device are disengaged.

The control finger 33b is in a state of being engaged with the first lug 35b, and the guide bolt 34 is located at P1 in the guide groove 33a. In addition, both the first fork unit 35 and the second fork unit 36 are in a state of maximally moving backward.

FIG. 5 shows that the disconnector device 10 is engaged, and the eLSD device 20 is continuously disengaged.

In the state of FIG. 4, when the driving motor 31 is operated by a controller, the screw nut 33 moves forward as the screw shaft 32 rotates. Since the rotation of the screw nut 33 is restricted by the guide bolt 34, when the screw shaft 32 rotates, the screw nut 33 moves linearly. The guide bolt 34 linearly moves the screw nut 33 while moving relatively in the disconnector device manipulation section S_D.

When the screw nut 33 moves forward in a state in which the control finger 33b has been engaged with the first lug 35b, the first fork unit 35 also moves forward as much as the displacement of the screw nut 33. When the screw nut 33 moves forward so that the guide bolt 34 is located from P1 to P2 in the screw nut 33, the first fork unit 35 also moves forward from P1 to P2 as much as the screw nut 33 moves forward (see FIG. 5).

As the first fork unit 35 moves forward and the first sleeve 15 coupled to the first fork 35c moves forward, the disconnector device 10 is in a fastened state.

In this case, the second fork unit 36 is in a disengaged state because it maintains an initial location.

FIG. 6 shows a state in which the control finger 33b moves from the first fork unit 35 to the second fork unit 36.

When the controller continuously operates the driving motor 31, the screw shaft 32 also rotates together. In this case, the screw nut 33 also rotates as the guide bolt 34 moves from P2 to P4 in the guide groove 33a.

FIG. 6 shows a state in which the guide bolt 34 is located at P3, which is a middle point of the connection section S_C of the guide groove 33a.

When the screw nut 33 rotates, the control finger 33b also rotates together to be separated from the first lug 35b and rotate toward the second lug 36b. Since the control finger 33b is separated from the first lug 35b and is in a state before engaged with the second lug 36b, the first fork unit 35 and the second fork unit 36 do not move in a state in which the guide bolt 34 is located in the connection section S_C, and the disconnector device 10 and the eLSD device 20 maintain their previous states.

Figure 7:
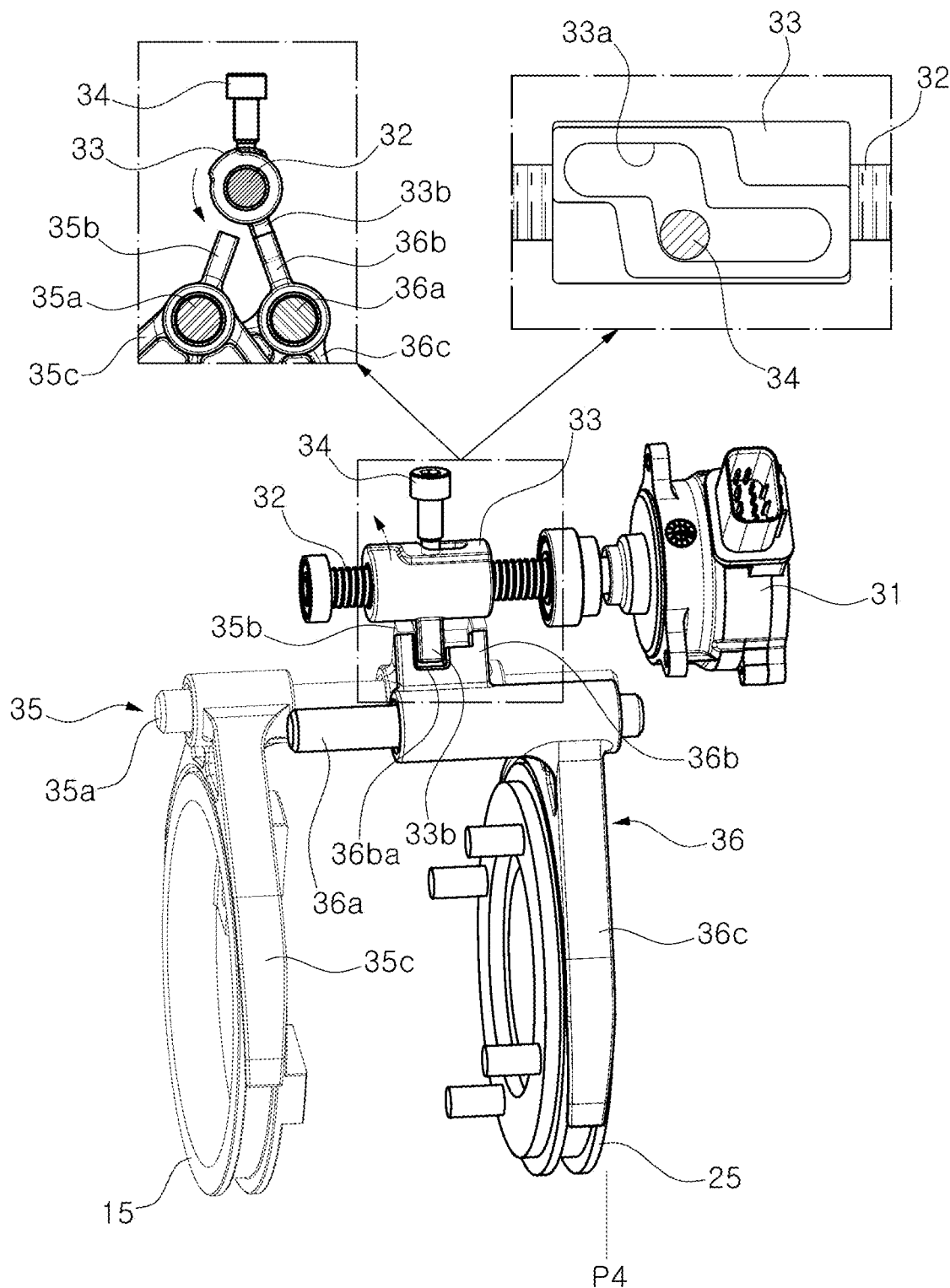
FIG. 7 is a perspective view, side view, and state view of the guide groove showing the integrated actuator assembly for a disconnector device and an eLSD device according to the present disclosure in a state in which the guide bolt is located at P4 of the guide groove.

FIG. 7 shows that the screw nut 33 rotates so that the control finger 33b is engaged with the second lug 36b, and the guide bolt 34 is located at P4, which is a front end of the eLSD manipulation section S_L.

Figure 8:
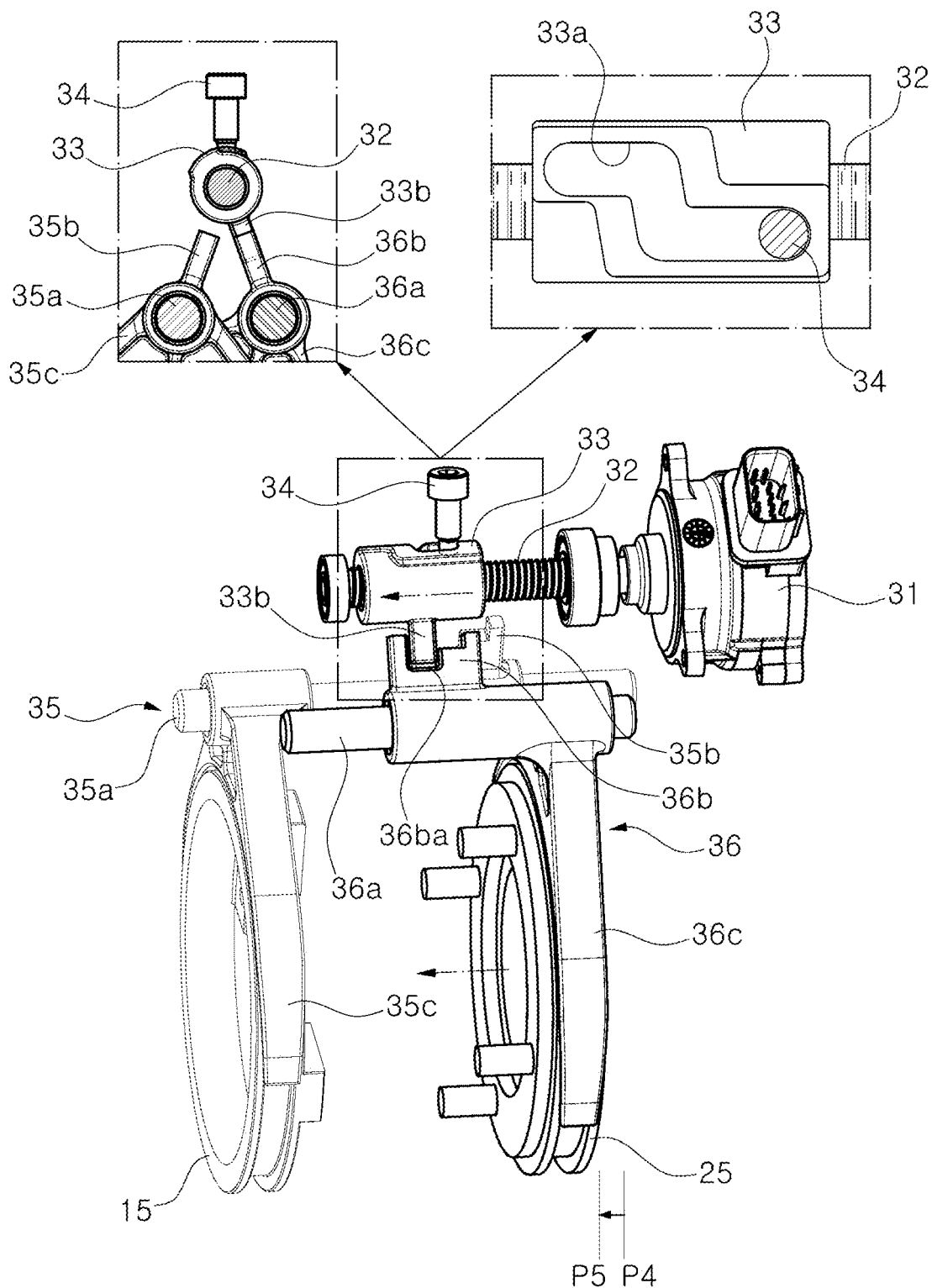
FIG. 8 is a perspective view, side view, and state view of the guide groove showing the integrated actuator assembly for a disconnector device and an eLSD device according to the present disclosure in a state in which the guide bolt is located at P5 of the guide groove.

FIG. 8 shows a state in which the screw nut 33 moves forward so that the eLSD device 20 is fastened. When the screw nut 33 moves forward in a state in which the control finger 33b is engaged with the second lug 36b, the guide bolt 34 moves relatively from P4 to P5 along the eLSD manipulation section S_L.

When the screw nut 33 moves forward so that the guide bolt 34 is located from P4 to P5, the second fork unit 36 also moves forward as much as the screw nut 33 moves forward, and the second fork 36c also moves forward from P4 to P5 (see FIG. 8).

As the second fork unit 36 moves forward and the second sleeve 25 coupled to the second fork 36c moves forward, the eLSD device 20 is in a fastened state.

As described above, as the driving motor 31 rotates in one direction, the disconnector device 10 is first engaged, and then the eLSD device 20 is in a fastened state.

Therefore, the disconnector device 10 and the eLSD device 20 may be sequentially fastened using one actuator assembly.

Meanwhile, to disengage the disconnector device 10 and the eLSD device 20, the controller rotates the driving motor 31 in an opposite direction.

When the driving motor 31 rotates in the opposite direction, the screw nut 33 moves backward, and the actuator assembly operates in a direction opposite to the direction when fastened.

Therefore, the screw nut 33 moves backward in a state in which the control finger 33b has been engaged with the second lug 36b so that the eLSD device 20 is first disengaged. In a state in which the control finger 33b is separated from the second lug 36b and engaged with the first lug 35b, the disconnector device 10 is disengaged by the backward movement of the screw nut 33.

Even when the disconnector device 10 and the eLSD device 20 are disengaged, the eLSD device 20 and the disconnector device 10 may be disengaged sequentially.

The invention claimed is:

1. An integrated actuator assembly for a disconnector device and an electronic limited slip differential (eLSD) device, the integrated actuator assembly comprising:
   a driving motor;
   a screw shaft configured to be rotated by the driving motor;
   a screw nut coupled to the screw shaft and configured to linearly move in an axial direction of the screw shaft by rotation of the screw shaft;
   a first fork unit engaged with the screw nut and configured to linearly move a first sleeve of the disconnector device;
   a second fork unit engaged with the screw nut and configured to linearly move a second sleeve of the eLSD device; and
   a fork selection member configured to control the screw nut to be engaged with any one of the first fork unit and the second fork unit.

2. The integrated actuator assembly of claim 1, wherein the fork selection member includes:
   a guide groove formed in a surface of the screw nut along a trajectory set on the screw nut at a predetermined depth; and
   a guide bolt configured to guide linear movement of the screw nut, wherein an end portion of the guide bolt is inserted into the guide groove so that the screw nut rotates along a linear movement displacement of the screw nut.

3. The integrated actuator assembly of claim 2, wherein the guide groove is formed with:
   a disconnector device manipulation section formed in the axial direction of the screw nut;
   an eLSD manipulation section disposed at an interval in a circumference direction of the screw nut from the disconnector device manipulation section, and formed in an axial direction of the screw nut; and
   a connection section connecting one end of the eLSD manipulation section to an end of the disconnector device manipulation section.

4. The integrated actuator assembly of claim 3, wherein an angle formed between the connection section and the disconnector device manipulation section or the eLSD manipulation section is an obtuse angle.

5. The integrated actuator assembly of claim 1, wherein the screw nut is formed with a control finger extending in a radial direction of the screw nut, and the control finger is engaged with any one of the first fork unit and the second fork unit.

6. The integrated actuator assembly of claim 5, wherein the screw nut rotates in a circumference direction of the screw nut to engage the control finger with any one of the first fork unit and the second fork unit.

7. The integrated actuator assembly of claim 5, wherein the first fork unit includes:
   a first lug engaged with the control finger; and a first fork formed integrally with the first lug and coupled to a circumference of the first sleeve by being inserted into the circumference of the first sleeve; and wherein the second fork unit includes:

a second lug engaged with the control finger; and a second fork formed integrally with the second lug and coupled to a circumference of the second sleeve by being inserted into the circumference of the second sleeve.

8. The integrated actuator assembly of claim 7, wherein the control finger is engaged with any one of the first lug and the second lug.

9. The integrated actuator assembly of claim 8, wherein the first lug and the second lug are disposed at a predetermined angle in a circumference direction of the screw nut.

10. The integrated actuator assembly of claim 7, wherein a manipulation groove to which the control finger is engaged is formed in each of the first lug and the second lug.

11. The integrated actuator assembly of claim 1, wherein a center of the first sleeve aligns with a center of the second sleeve.

* * * * *